United States Patent [19] [11] 3,827,789
Molner et al. [45] Aug. 6, 1974

[54] MONITORING DEVICES
[75] Inventors: Stanley F. Molner, Morristown, N.J.; Joel S. Newman, Framingham, Mass.
[73] Assignee: Biometrics, Inc., Cambridge, Mass.
[22] Filed: Sept. 5, 1972
[21] Appl. No.: 286,422

Related U.S. Application Data
[63] Continuation-in-part of Ser. No. 104,858, Jan. 8, 1971, abandoned.

[52] U.S. Cl............................ 351/23, 351/7, 351/30
[51] Int. Cl............................................... A61b 3/02
[58] Field of Search ...................... 351/23, 24, 7, 30

[56] References Cited
UNITED STATES PATENTS
| | | | |
|---|---|---|---|
| 3,079,838 | 3/1963 | Markwood | 88/20 |
| 3,172,404 | 3/1965 | Copenhaven et al. | 351/24 |
| 3,269,792 | 8/1966 | Mirsky | 351/30 |
| 3,421,498 | 1/1969 | Gans | 351/24 |
| 3,473,868 | 10/1969 | Young et al. | 351/7 |
| 3,664,732 | 5/1972 | Lynn | 351/24 |

*Primary Examiner*—Harold A. Dixon
*Attorney, Agent, or Firm*—Wolf, Greenfield & Sacks

[57] ABSTRACT

A method and apparatus for measuring a subject's visual field by presenting a target consisting of a spot of light at a series of selected locations within the subject's visual field and monitoring and interpreting his resulting eye movements and positions. The technique makes use of the tendency of the subject's eyes to respond to the sudden appearance of the dot of light by fixating on that target within a relatively short time after the target has been presented to him. The apparatus employed to measure the subject's visual field includes a projector which presents the light-dot targets in a known sequence on a screen before the subject, and simultaneously makes a permanent photographic image of those light-dot targets which the subject sees as determined by the eye movement monitor and its associated logic circuitry. The permanent photograph shows the viewed light dots seen by the subject in substantially the same general arrangement as presented to him. The voids of the photograph represent those points not seen by the subject and thus map his blind spots. Alternatively, a photographic image of those light-dot targets which the subject was unable to see also may be made to provide a complementary representation of the subject's blind spots.

21 Claims, 5 Drawing Figures

INVENTORS
STANLEY F. MOLNER
JOEL S. NEWMAN
BY
Wolf, Greenfield & Sacks
ATTORNEYS INVENTORS
STANLEY F. MOLNER
JOEL S. NEWMAN
BY
*Wolf, Greenfield & Sacks*
ATTORNEYS

MONITORING DEVICES

This application is a continuation in part of our copending U.S. Pat. application, Ser. No. 104,858, filed on Jan. 8, 1971, now abandoned.

BACKGROUND OF THE INVENTION

Measurement of one's visual field is important for a variety of reasons including the diagnosis of glaucoma as well as many other human visual system diseases or impairments. In general, the prior techniques for measuring one's visual field and any blind spots which the subject may have, have been quite slow and tedious and require a difinite subjective response from the person being tested in order to determine whether he has sighted a target at a particular location in his visual field. Additionally, these currently employed tests require administration by one having a relatively high degree of skill such as an ophthalmic technician, optometrist, or ophthalmologist. For example, in the most common type of visual field test, a hand-held target, such as a small disc at the end of a wand, is moved around the subject's visual field by the examiner while the subject fixates on some central point. During movement of the hand-held target through the subject's field, the examiner asks the subject repeatedly whether he can see the movable target as it is passed from location to location. The examiner then normally plots the location of each point which was seen by the subject, or alternatively, he may plot those locations which the subject was unable to see, and which, therefore, define his blind spots.

In order to overcome the uncertainties and difficulties in the foregoing testing techniques some attempts have been made to automate partly the foregoing visual field test, such as employing an arrangement for automatically presenting a series of targets to the subject. Although these devices are somewhat faster than the completely manual test described above, they still are relatively slow and require that the subject respond consciously and intentionally when he sees the target. For example, the response may be verbal or may be indicated by the subjective manipulation of a lever or a button.

Also among the primary difficulties in obtaining fast and accurate plots of a subject's visual field is that the examiner must be assured that the subject's gaze is directed toward a central fixation point or other known reference point before the target is presented to him. In some instances this may be quite difficult when problems of communication exist between the subject and the examiner as, for example, when testing the young, the aged, or persons whose native language is different from that of the examiner. Furthermore, any such difficulties render efficient and accurate testing still more complicated because it may confuse the results of the tests.

It is among the primary objects of the invention to provide a method and apparatus for determining a subject's visual field which avoids the foregoing difficulties.

SUMMARY OF THE INVENTION

In brief, the invention utilizes the natural characteristic voluntary or involuntary eye movements which result when a target is presented suddenly to a subject within his visual field. Measurement of the eye movement or change in eye position in response to presentation of the target is employed to determine whether the subject has seen the target. The invention may employ a variety of devices for measuring and monitoring subjects eye movements such as, for example, a device of the type shown in U.S. Pat. No. 3,473,868.

The invention utilizes a target projector which develops a narrow collimated light beam and directs the beam sequentially toward selected locations on a screen which is within the subject's visual field. The position of the intermittent light beam and light dot which it forms on the screen is determined by reflecting the beam off the surface of a mirror arrangement toward the screen. The attitude of the mirror is controllable about horizontal and vertical axes to control the direction of the emitted beam by a programming cam. The cam is removable from the projector and may be replaced by other cams which represent other sequences of light dot presentations.

The position of the beam and light-dot on the screen, as presented to the subject, is recorded permanently and automatically on a photographic plate incorporated into the projector. In the preferred embodiment, this photographic plate is of the Polaroid type which enables immediate inspection after the test. The photographic recording arrangement includes a partially silvered mirror or beam splitter located along the path of the reflected collimnated beam. The reflector portion of the split beam is directed toward the photographic plate and impinges on the photographic plate along a direction which is dependent on the angle of incidence of the reflected beam on the beam splitter and the attitude of the beam splitter. A shutter is located along the path of the reflected portion of the split beam and is controlled to open only when the subject has sensed presentation of a particular light dot target on the screen. In one mode of operation only those points which are observed are recorded. In another mode of operation, only those points which are not observed are recorded to provide a plot of the subject's blind spot or spots. Furthermore, they are recorded in substantially the same relative position in which they are presented to the subject. The shutter is controlled by the output signal from the eye movement measuring device referred to above.

Another aspect of the invention relates to an arrangement for presenting a sequence of light-dot targets on the screen in close proximity to each other rather than at more widely spaced locations about the screen. This enables precise plotting of an area of a subject's blind spot or spots once the more coarse presentation of the target spot has indicated the general location of the blind spot or spots.

It is among the primary objects of the invention to provide an improved technique for determining and plotting the visual field of the subject.

Another object of the invention is to provide an improved technique in which a subject's response to a series of targets presented at various locations in his visual field is determined objectively without any subjective response on his part.

A further object of the invention is to provide an arrangement for making a permanent record of the subject's visual field.

Still another object of the invention is to provide an improved technique for plotting and measuring a subject's visual field without requiring that the test be administered by highly skilled personnel.

DESCRIPTION OF THE DRAWINGS

These an other objects and advantages of the invention will be understood more fully from the following detailed description thereof, with reference to the accompanying drawings wherein.

DESCRIPTION OF THE PREFERRED EMBODIMENT

Figure 1:
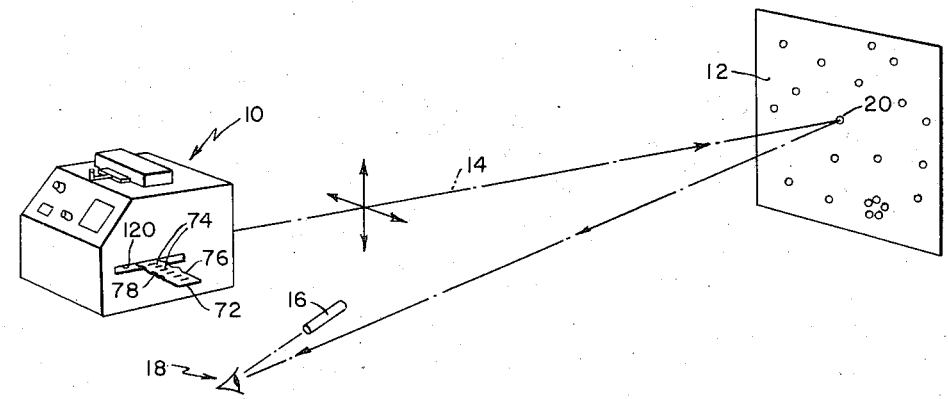
FIG. 1 is an illustration of the invention and the manner in which it is employed to test a subject's visual field.

FIG. 1 shows the basic elements of the apparatus employed to practice the invention including the projector 10, screen 12 or other surface onto which the projected light beam 14 may be directed, and eye movement monitoring device 16. As described more fully herein, the projector 10 is adapted to direct the light beam 14 intermittently toward different locations on the screen 12. The subject, as suggested in 18 is located in front of the screen during the test so that the screen 12 fills all or at least a substantial portion of his visual field.

In order to insure accurate test results it is essential that the subject is looking directly at a known reference or central fixation point on a screen at the time that a target is presented to him on the screen. It is also important to provide a chin rest (and perhaps headrest) to fix the position of his head. In one testing technique a central fixation point 20 is provided toward which the subject is instructed to look. In this mode the central fixation point remains illuminated throughout the test. The invention permits the person administering the test to confirm that the subject's gaze is directed towards the central fixation point by referring to a readable output from the eye movement monitoring device 16, which output may be on a meter, on signal lights, in strip chart form or other appropriate readout device. The subject may be instructed to look at the central fixation point 20 unless he sees another light or dot, in which case he should look at the other light. If the subject is able to see the newly presented target, his eye movement will be sensed by the monitoring device 16.

The output from the monitoring device 16 is fed back to the projector unit and is effective to control the operation of a photographic recording unit which makes a photographic record of all points presented within the subject's visual field which he has been able to see. Another operating mode is also possible when employing the foregoing testing technique. One may extinguish the central fixation point 20 while the target is being presented to the subject or otherwise render the central fixation point 20 relatively obscure in relation to the presented target. Alternatively a photographic record may be made of those points which the subject has not seen. In this mode of operation the subject's eye movement characteristic of not having seen the spot, or his lack of eye movement, will be sensed by the monitoring device. The output from the monitoring device 16 is fed back to the projector unit in a manner which controls operation of the photographic recording unit to record only those points not seen by the subject.

A variety of eye movements which are characteristic of the subjects sensing of a presented target may be employed to indicate whether he has sighted the target. The output from the eye movement monitoring device is fed into an appropriate detection and logic circuit to measure and sense the existence of one or more of the characteristic eye movements. For example, in the most simple case, an indication that the subject's eyes have departed from the fixation point may be employed as a measure of whether he has seen the target. More sophisticated discrimination between the meaningful eye movement and those resulting from other extraneous stimuli may be accomplished by utilizing well known characteristics of various kinds of eye movements. For example, these characteristics may include the direction in which the subject's eyes have moved, the magnitude of the eye movement, the latency or duration between presentation of the target, and the resulting eye movement and the angular speed with which the subject's eyes depart from the fixation point.

Although involuntary eye movements are the preferred response, voluntary eye movements may also be effectively used.

Figure 2:
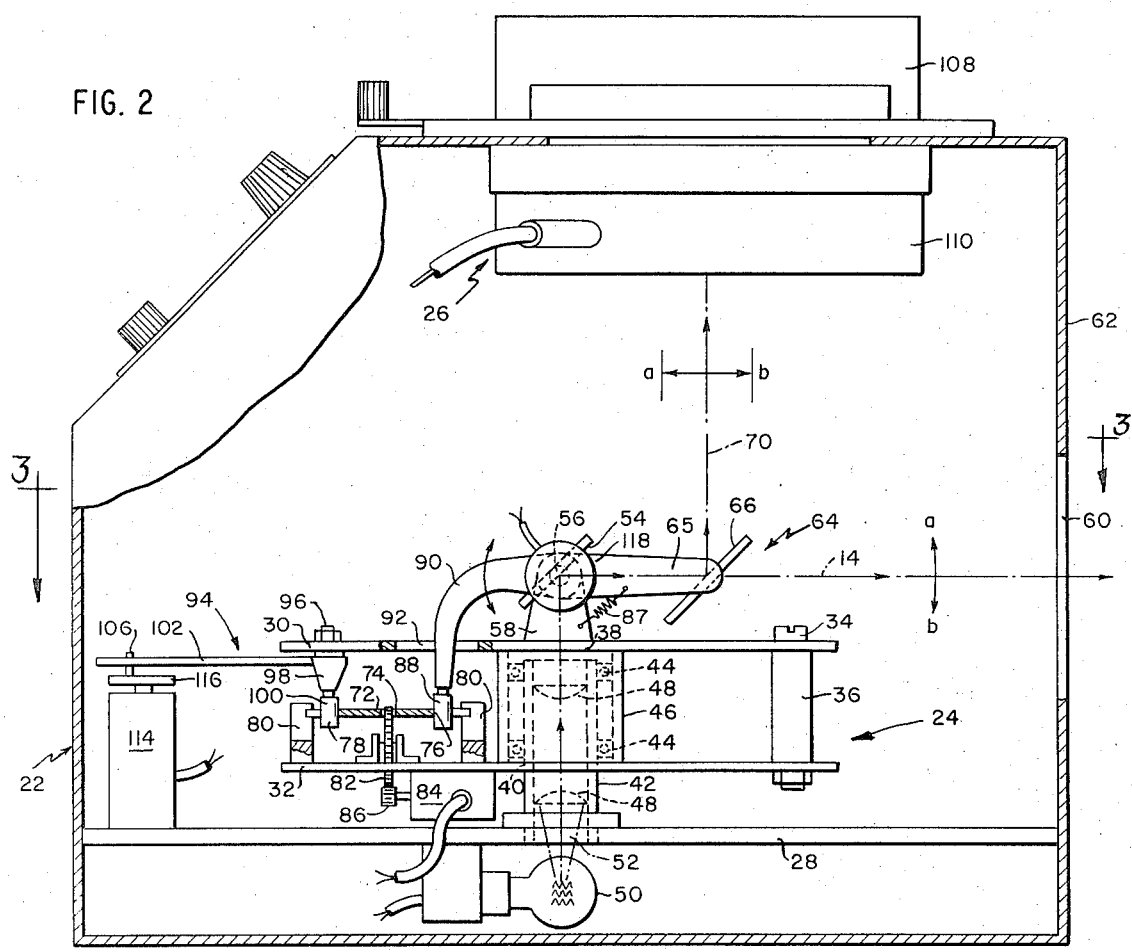
FIG. 2 is a side elevation, in section, of the projector used in accordance with the invention.
Figure 3:
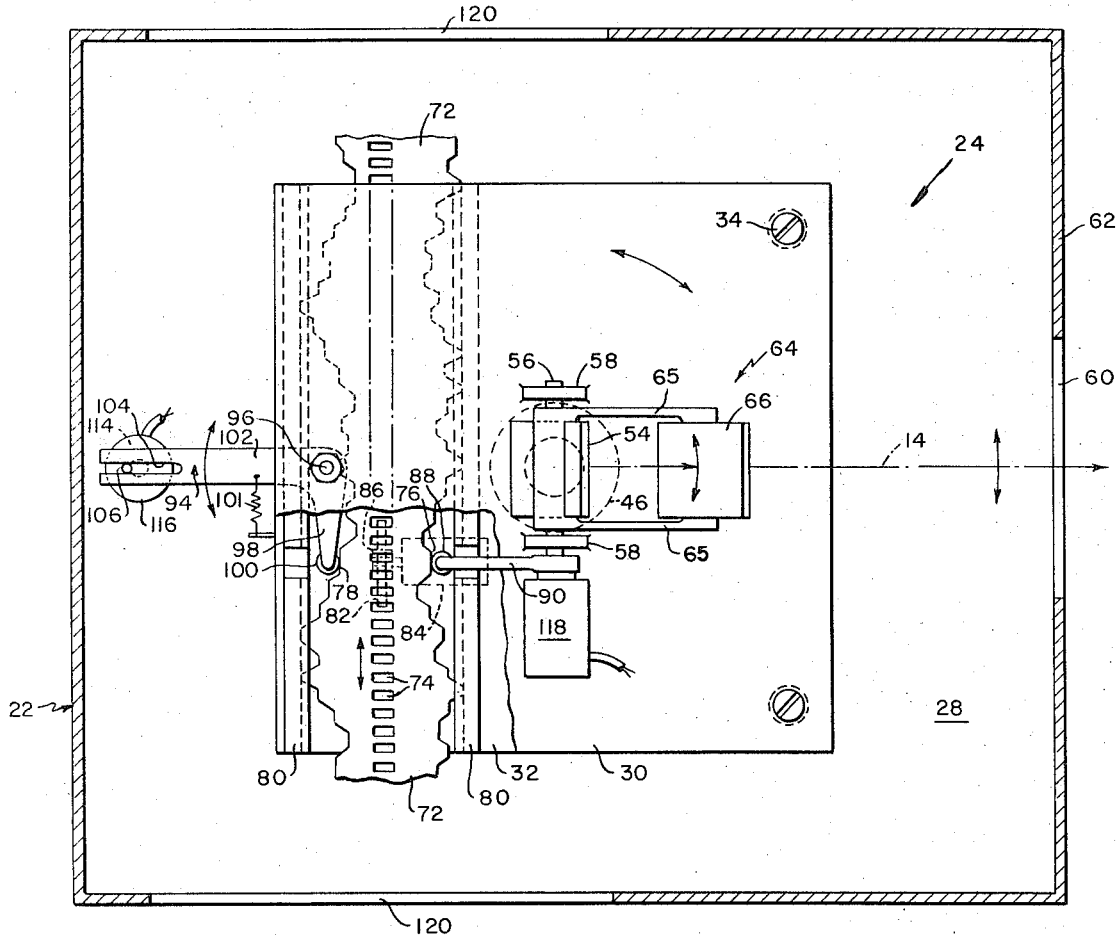
FIG. 3 is a plan view, partly in section, of the projector as viewed along the line 3—3 of FIG. 2.

FIGS. 2 and 3 show an illustrative embodiment of the projector 10 which includes a housing 22 containing a turntable projection unit 24 and a photographic recording unit 26 above the projection unit 24. The projection unit 24 is supported on a bottom support wall 28 within the housing 22 and includes a pair of heightwise spaced plates, 30, 32 which are secured to each other as by appropriate bolts 34 and spacers 36. Each of the plates, 30, 32 has a central opening 38, 40 therein. The opening 40 in the lower plate 32 receives an upstanding column 42. The plates 30, 32 are rotatably journaled to the column 42 for rotation about a vertical axis by the bearings 44 which also are connected to a central sleeve 46 disposed between the plates 30, 32.

A collimating lens assembly 48 is contained within the column 42 and receives light from an appropriate source 50 supported beneath the bottom support wall 28 in central registry with the column 42. An opening 52 is provided in the bottom support wall to enable the light to pass upwardly from the source 50 through the lens system 48. The opening 52 preferably is of relatively small dimensions to confine the light to a narrow beam.

The upwardly directed narrow collimated light beam is reflected by a mirror 54 which is mounted above the upper plate 30 for pivotal movement about a horizontal transverse axis 56 by the trunions 58. The axis 56 is disposed in relation to the optical axis of the lenses 48 so that the beam inpinges on the mirror substantially at the axis 56. The vertical elevation of the deflected light beam 14 thus can be controlled by pivoting the mirror 54 about the axis 56. Similarly, the horizontal direction of the beam 14 may be controlled by pivoting the entire projection unit 24, including the mirror 54, about the vertical column 42. The reflected beam 14 is directed forwardly through an opening 60 formed in the front wall 62 of the housing 22, the opening 60 being large enough as not to interfere with the projected beam 14.

The projection unit 24 also includes a beam splitter 64 which may comprise a half or otherwise partially silvered mirror 66, mounted forwardly of and parallel to the mirror 55. The beam splitter 66 is mounted to mirror 54 for pivotal movement therewith by the forwardly extending arms 65. The half-silvered mirror 66 reflects a portion of the light beam reflected from the mirror 54 upwardly along the path 70 toward the photographic recorder unit 26. The half silvered mirror 66 is disposed at an angle to the horizontal and in relation to the mirror 54 such so one portion of the split secondary light beam 70 will be directed toward the film plane of the photographic recorder unit 26 in substantially the same relative position as that in which the primary light beam 14 is directed toward the screen 12. During operation, as the mirror 54 and parallel beam splitter mirror 64 are pivoted to various angles about the axis 56, any change in the direction of the forwardly directed beam 14 results in a simultaneous and corresponding shift in position of the vertical split beam 70. For example, when the mirror 54 is pivoted counter-clockwise as shown in FIG. 2, the elevator of the beam 14 would be shifted upwardly while the split-beam 70 would be shifted to the left and as suggested by the arrowhead $a$. Conversely, clockwise pivoting of the mirror 54 would lower the elevator of the beam 14 and shift the split-beam 70 as suggested by the arrowhead $b$. In this manner, when a beam 14 is directed toward a particular location on the screen, the split-beam 70 will be directed toward the photographic recorder unit 26 along a corresponding path which may be recorded by a sheet of film in the photographic recorder unit 26 as described more fully herein.

In the illustrative embodiment of the invention, the attitude of the mirror 54 is controlled about its horizontal and vertical axes by a cam arrangement which is effective to pivot the mirror 54 about the axis 56 and also simultaneously pivot the entire turntable projection unit 24 about the vertical axis of the column 42. The camming arrangement includes a removable, changeable cam plate 72 having a series of rack-like apertures 74 equally and longitudinally spaced along the cam plate 72. The longitudinal edges of the cam plate are formed to define camming surfaces 76, 78. The cam 72 is received and slideably guided for movement along its length by a pair of slotted cam guides 80 which are secured to the lower plate 32 of the projection unit 24 which engage slideably the edges 76, 78 of the cam at selected locations along those edges as shown in FIG. 3. The cam plate 72 is advanced incrementally along and between the guides 80 by a pinion 82 which is pivotally mounted to the lower plate 32 and which is in engagement with the racklike apertures 74 and the cam. The pinion 82 is driven in incremental steps by a stepping motor 84 which may be secured to the underside of the lower plate 32 and which has a drive gear 86 enmeshed with the pinion 82.

The camming surfaces 76, 78 are employed to control the pivotal attitude of the mirror 54 about the horizontal axis 53 and to control the pivotal attitude of the complete projection unit 24 (including the mirror, 54) about a vertical axis, respectively. The attitude of the mirror 54 about the horizontal axis 53 is controlled by a cam follower 88 which is rotatably mounted to the lower end of an arm 90 which, in turn, is connected to the mirror 54. The arm extends downwardly through an opening 92 in the upper plate 30 and is biased by a spring 87 in a clockwise direction as shown in FIG. 2 to maintain the cam follower 88 in firm engagement with the camming surface 76. As the cam 72 is advanced by the stepping motor 84, the cam follower 88 shifts accordingly to pivot the mirror 54 and control the vertical elevator of the light beam 14.

The pivotal attitude of the projection unit 24, and, therefore, the mirror 54 about a vertical axis is controlled with reference to the camming surface 78 of the cam plate 72. In this arrangement, the entire projection unit is caused to pivot about the vertical axis of the column 42 by a bell crank 94 which is pivoted between its ends to the projection unit, as at the upper plate 30 at the pin 96. One arm 98 of the bell crank 94 rotatably supports a cam follower 100, biased into engagement with the camming surface 78 of the cam plate 72 by a spring 101. The other arm 102 of the bell crank 94 is slotted at 104 along its length and receives a pin 106 which is maintained in a fixed location during advancement of the cam plate 72. Thus, as the cam plate is advanced by the stepping motor 84, the action of the camming surface 78 against the cam follower 100 will tend to pivot the bell crank 94 about the pin 106 and impart incremental rotary motion to the projection unit 24 through the pin 96. The slot 104 permits the bell crank arm 102 to shift slightly axially in relation to the pin 106 as the projection unit 24 is pivoted.

Additionally, as the projection unit is pivoted the beam splitting unit 64 also pivots about the vertical axis to direct the split beam 70 toward the location on the film plane in the photographic recording unit 26 to a location corresponding to that on the screen 12 toward which the beam 14 is directed.

Figure 5:
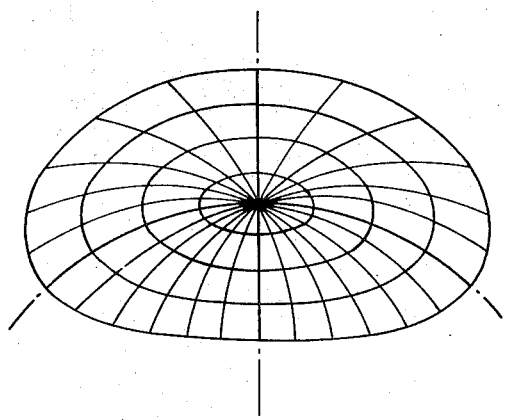
FIG. 5 is an illustration of the grid used in association with the photographic recorder.

Referring now to FIG. 2 the photographic recording assembly 26 includes a film holder 108 adapted to support a sheet of film along a film plane. Preferably the film holder may consist of a conventional Polaroid camera back which holds a roll of self-developing film. The photographic recording unit 26 also includes a shutter assembly 110 mounted to the housing 22 below the film holder 108. In the preferred embodiment, the camera back is provided with a grid which becomes superimposed on the film. The grid may include polar coordinates which correspond to the coordinates on the presentation screen 12. In the illustrative embodiment shown, the grid is distorted slightly from a circular or rectangular configuration and will define a slightly flat polar or slightly arcuate rectangular grid as shown in FIG. 5. The slight distortion of the grid compensates for the arcuate path through which the split beam 70 moves when the turntable is pivoted about a vertical axis to change the azimuth of the projected beam 14. The distortions, however, are slight and the resulting, slightly distorted photographic array may be interpreted easily to one familiar with the conventional circular polar and rectangular coordinate grids.

When recording photographically only those light-dot targets which the subject sees, the shutter assembly 110 is controlled to open only when the eye movement monitoring device 16 senses that the subject has, in fact, seen the target. Any of a variety of commercially available electronically operated shutter mechanisms may be employed. Thus, when the subject's eyes move from the central fixation or reference point 20 toward the newly presented target, the output from the eye monitoring device 16 is employed to trigger the shutter. In order to reduce the likelihood that random eye movements or other eye motions which are not responsive to presentation of a target do not trigger the shutter 110, the output from the eye movement monitoring device is coupled to the shutter 110 through a timing device and logic circuit 112 (See FIG. 4) which determines whether or not the subject has seen the presented target. The output from the logic circuit provides a target seen signal or a target missed signal. These outputs are fed through a seen/missed selector 160, the output of which controls operation of the shutter 110. The seen/missed selector may be set to operate the shutter either in response to a "target seen signal" or a "target missed signal" from the timing and the logic circuits 154. For example, when recording seen targets, the seen/missed selector 160 is set to direct "target seen" signal to the shutter 110. When the measured parameter is the elapsed time between target presentation and initiation eye movement, the timing and logic circuit may be designed as to open the shutter 110 only if the eye movement has occured within 200 milliseconds or, roughly, one quarter of a second after the target has been presented. It has been determined that when the subject senses the presence of the target his eyes will tend to move, involuntarily, toward the target within this time interval. The timing and logic circuitry may be designed also to trigger the shutter in response to other eye movements which are characteristic of positive responsive eye movements. Alternatively, the seen/missed selector 160 may be set to operate the shutter 110 only in response to "target missed" signals which results in a photographic plot of the missed targets and thus the subject's blind spot or spots.

When the subject fails to see a target spot, or when it otherwise becomes apparent that there is a particular blind spot in the subject's visual field, it is desirable to examine the extent of this blind spot in greater detail than is permitted by the relatively course target array obtained by operation of the camming surfaces and their associated cam followers. To provide capability for examining such blind spots in fine detail, additional fine scale stepping devices are provided to pivot the mirror 54 about horizontal and vertical axes to direct the light beam 14 to present a series of targets spaced more closely to each other on the screen 12 in suspected blind region or regions of the subject's visual field. A vernier scan of the suspected blind region preferably is automatically initiated each time the subject misses a target point. The vernier scan control signal is derived from the eye movement monitor output as is the photographic plate shutter control. Alternately, the vernier scan could be initiated manually if so desired.

Fine pivotal movement about a vertical axis is provided by a fine vernier stepping motor 114 which may be supported on the bottom wall 28. A disc 116 is mounted to the shaft of the motor 114 and the pin is eccentrically mounted to the disc 116. When operating the vernier stepping motor 114, the cam stepping motor is not operated. Because the bell crank is biased to maintain the cam follower 100 in engagement with the cam 72, the bell crank and projection unit act as a rigid member and rotate in unison above the central vertical axis of the column 42 as the cam 106 is eccentrically rotated into its various incremental positions by the motor 114. Similarly, the fine incremental pivotal movement of the mirror 54 about the horizontal axis 56 is controlled by a fine vernier stepping motor 118 which is mounted to the arm 90 and which is eccentrically connected to the mirror 54. During operation of the vernier motor 118, the cam follower 88 is maintained in its biased position against the cam 72.

The invention permits a variety of tests to be performed in that the cam 72 may be replaced by other cams having surfaces adapted to permit a different sequence of light-dot targets on the screen. The replacement cams may be inserted simply through slots 120 formed on the sides of the housing 22.

Figure 4:
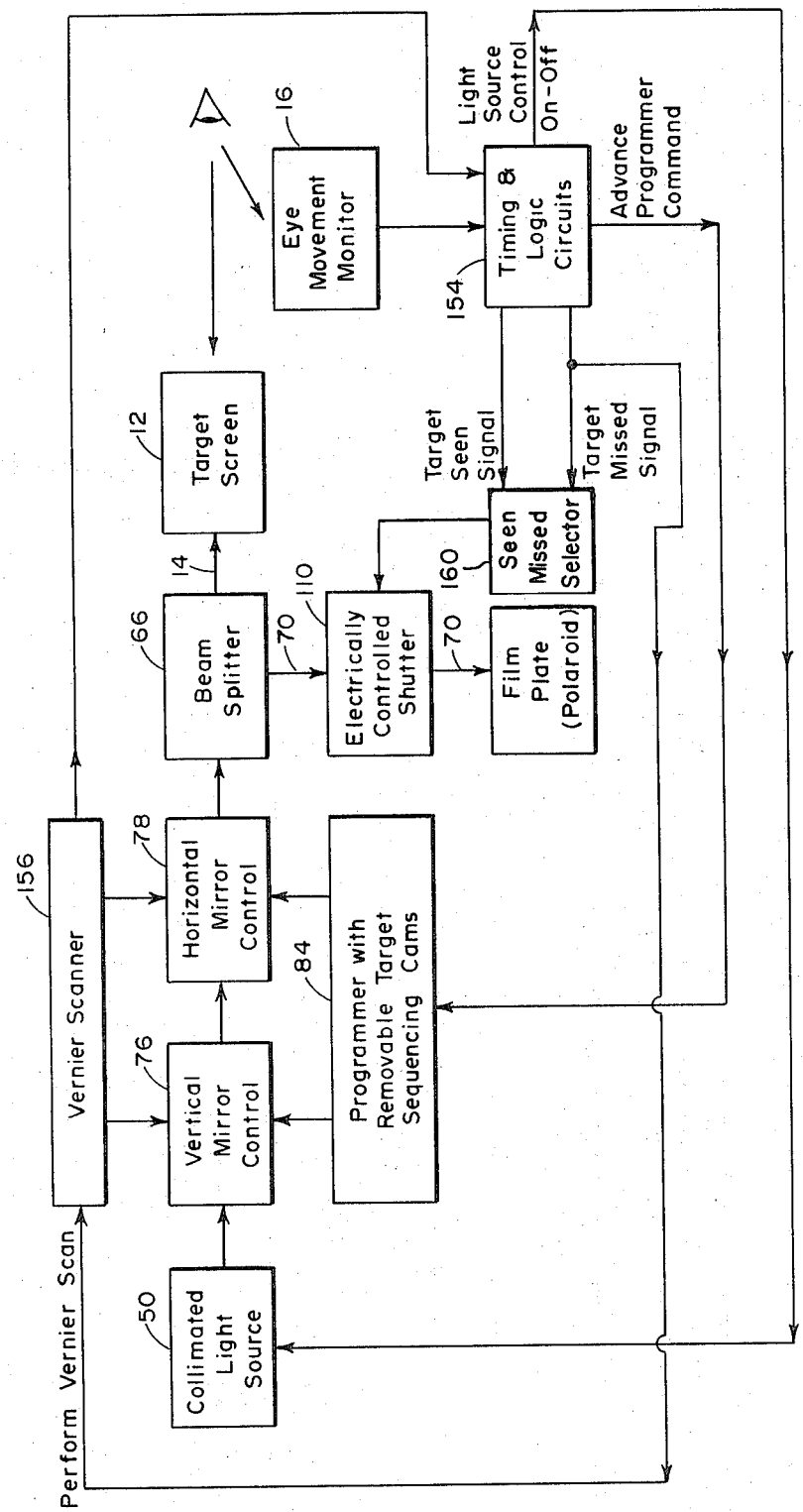
FIG. 4 is a block diagram illustrating the control arrangement and circuitry associated with the recorder.

The block diagram of FIG. 4 summarizes the operation of the device. The light from the collimated light source 50 is directed along the projection path 14 along a direction determined by the vertical mirror control 76 and horizontal mirror control 78 described herein. A portion of the projected beam is split along the path 70 toward the film plate through the electronically controlled shutter mechanism 110. When the subject sees the presented target his eyes will move voluntarily or involuntarily and display one or more of the typical characteristics described herein. The output from the eye movement monitor is fed into the timing and logic circuitry 154. The output from the timing and logic circuitry 154 comprises a signal indicative of whether the subject has seen or missed the target. These signals are fed into a seen/missed selector 160 which may be controlled by the operator to operate the shutter 110 either to photograph the targets seen or the targets missed. Thus, with the seen/missed selector responsive to the "target seen signal," the timing and logic circuitry 154 is effective so that when the output signal from the eye movement monitor 16 indicates a genuine sighting of the target, the electronically controlled shutter 110 will be actuated to record the location of the target on the grid of the film plate. Additionally, when the target has been sighted the timing and logic circuitry actuates the programmer (stepping motor 84) to advance the cam to the next position, thus controlling the attitude of the mirror 54 and the position of the next presented target. The timing and logic circuitry also actuates the collimated light source 52 to turn the light on. It should be noted that the light source 50 is turned off automatically after a predetemined time interval but before the next target is presented. Alternatively, switching of the seen/missed selector to the "missed" mode would operate the shutter when the "target missed" signal was produced by the timing and logic circuitry 154.

In the event that the subject does not sense the presentation of the new target, this will be reflected in the output from the eye movement monitor 16. In this event, the timing and logic circuitry controls automatically the operation of the vernier scanning arrangement 156 which controls the horizontal and vertical attitude of the mirror 54 through the vernier stepping motors 114, 118. As described above this provides for a relatively fine array of targets which enables the subject's blind spot to be mapped carefully. During operation of the vernier scanners a series of closely spaced targets are presented to the subject. The eye movement monitor 16 detects whether the subject has sensed each of the targets and the timing and logic circuitry 154 and seen/missed selector functions as described above to control operation of the shutter and to control operation of the collimated light source and central fixation point. When operating in the vernier mode, however, the timing and logic circuitry is ineffective to advance the programmer (stepping motor 84) so that the cam remains stationary during the vernier scan. After the vernier scan has been completed, the timing and logic circuitry is triggered to enable the stepping motor 84 to be operated again.

Thus, we have described an improved method and apparatus for testing a subject's visual field and for locating any blind spots in the field which avoids the requirement for the subjective response by the subject. Additionally the technique may be employed by persons having considerably less skill than has been required in order to administer such tests by currently employed techniques. It should be understood, however, that the foregoing description of the invention is intended merely to be illustrative thereof and other embodiments and modifications of the invention may be apparent to those skilled in the art without departing from its spirit.

Having thus described the invention what we desire to claim and secure by Letters Patent:

We claim:

1. A method for objectively testing the visual field of a subject:
   providing a reference fixation target within the subject's visual field:
   thereafter sequentially presenting a target image to said subject at predetermined varying locations within the subject's visual field and in relation to said reference target, said reference target being presented to said subject at least during each interval between sequential presentation of said target image;
   monitoring directly the position and movement of the subject's eye;
   detecting, for a predetermined time interval after presentation of said target image, those of the subject's monitored eye positions and movements which display at least one selected characteristic which is indicative of whether the subject has actually visually detected the target image while fixating on said reference target;
   automatically photographically recording the relative location of said target images presented to said subject and which are detected as being indicative of said characteristic eye position and movement and from which is determined the visual field of the subject being tested.

2. A method for objectively testing the visual field of a subject as defined in claim 1 wherein said at least one selected characteristic of the subject's eye movement includes determining the duration of the interval between presentation of said target and the subject's eye movement.

3. A method as defined in claim 1 wherein said step of presenting said target image comprises;
   projecting a light beam onto a reflective surface within the subject's visual field and at a predetermined location thereof in spaced relation to said fixed reference target; and
   varying the direction of said projected light beam to present a series of light-dot targets to said subject at various locations within his visual field.

4. A method as defined in claim 3 wherein said step of recording the relative location of said target image in the visual field comprises:
   directing a secondary light beam toward a photographic film plane in relation to said film plane corresponding to that at which said projected beam bears to said reflective surface; and
   exposing said film plane to said secondary light beam only when the existence of said selected characteristic eye movement is sensed whereby only those targets which are detected by said subject will be recorded on said film plane.

5. A method as defined in claim 1 wherein said reference fixation target is rendered obscure in relation to said target image during presentation of said target image.

6. A method as defined in claim 1 wherein said target images are presented in succession at various predetermined locations spaced from said reference point said locations being spaced relatively widely from each other to define a coarse array of targets;
   determining the general existence of a region of said targets in said coarse array which are not detected by said subject thus to indicate generally a region of blindness in the subject's visual field;
   presenting a second array of targets to said subject in said region of said blind spot, said targets in said second array being spaced more closely to each other than in said coarse array to define a fine array and to enable the boundary regions and extent of said blind spot to be examined closely.

7. A method as defined in claim 6 wherein said step of presenting said second array of targets to said subject is effected in response to the sensing of an eye movement other than one having said selected characteristics in response to presentation of said target.

8. A method as defined in claim 1 wherein said reference fixation target is maintained in a visible state during presentation of said target image.

9. A method as defined in claim 1 wherein said reference fixation target is extinquished upon presentation of each of said target images to said subject.

10. An apparatus for objectively testing the visual field of a subject comprising:
    means defining a reference fixation target within the subject's visual field;
    means for sequentially presenting a target image to said subject at predetermined varying locations within the subject's visual field and in relation to said reference target including means for presenting said reference target to said subject at least during each interval between said sequential presentation of said target image;
    means for monitoring directly the position and movement of the subject's eye;
    means for detecting, within a predetemined time interval after presentation of a target image, those of the subject's monitored eye positions and movements which display at least one selected characteristic which is indicative of whether the subject has actually visually detected the target image while fixating on said reference target;
    means for automatically photographically recording the relative location of said target images presented to said subject and which are detected as being indicative of said characteristic eye position and movement and from which is determined the visual field of the subject being tested.

11. An apparatus as defined in claim 10 wherein said means for detecting the movement of the subject's eyes comprises:
   means for determining the duration of the time interval between presentation of said target and subsequent eye movement of said subject.

12. An apparatus as defined in claim 10 wherein said means for presenting said target at said variable positions comprises:
   means for projecting a beam of light toward said surface located within the subject's visual field to produce a visible light-dot target on said surface; and
   means for changing the direction of said light beam to vary the location of said light-dot target on said reflective surface and to project the series of light-dot targets in a predetermined sequence.

13. An apparatus as defined in claim 12 wherein said means for automatically photographically recording the relative position of those of said detected target images comprises:
   means for supporting a photographic film along a film plane;
   means for directing a secondary light beam toward said film plane toward said reflective surface, said secondary light beam being directed toward said film plane in the corresponding location relative thereto as that in which said primary light beam is directed toward said reflective surface; and
   means responsive to said detecting of said characteristic position and movement of the subject's eye for exposing said film to said secondary light beam.

14. An apparatus as defined in claim 13 wherein said means for exposing said film to said secondary light beam comprises:
   shutter means normally blocking the path of said secondary light beam toward said film plane; and
   control means responsive to said means for detecting subject's eye position and movement for opening said shutter means.

15. An apparatus as defined in claim 13 wherein said means for directing said secondary light beam towards said film plane comprises:
   beam splitter means located along the path of said primary light beam and being adapted to reflect a portion of said primary light beam along a direction different from that of said primary light beam, said reflected portion of said beam comprising said secondary beam.

16. An apparatus as defined in claim 10 further comprising:
   means for photographically recording only those of said target images presented to the subject which are detected as having been sighted by the subject.

17. An apparatus as defined in claim 10 further comprising:
   means for photographically recording the relative location of those of said target images presented to the subject which are detected as not having been sighted by the subject.

18. An apparatus as defined in claim 10 wherein said means for sequentially presenting said target image comprises a projector for sequentially projecting light beams toward different locations on a reflective surface and in a predetermined array, said projector comprising:
   a frame;
   mirror means mounted to said frame;
   means for directing a light beam toward said mirror means, said mirror means being arranged to reflect said light beam toward said reflective surface;
   means mounting said mirror means for pivotal movement about horizontal and vertical axes to control the direction of said reflected beam; and
   means for controlling the attitude of said mirror means about said horizontal and vertical axis comprising:
   cam follower means operatively connected to said mirror means;
   cam means engageable with said cam follower means to vary the attitude of said mirror about said axes, said cam means being adapted to advance in incremental steps in engagement with said follower means;
   means for indexing said cam means in successive incremental steps past said follower means, said cam means having camming surfaces arranged in incremental steps and adapted to pivot said mirror means to attitudes about said axes corresponding to the configuration of said cam means in each of said incremental steps.

19. An apparatus as defined in claim 18 further comprising:
   means for recording photographically the relative position of said projected light beams in said array.

20. An apparatus as defined in claim 19 wherein said means for recording photographically the relative position of said light beams in said array comprises:
   means for supporting the photographic film along the film plane;
   beam splitter means located along the path of said reflected primary beam to reflect a secondary portion of said primary beam toward said means for supporting said film; and
   shutter means located along the path of said secondary beam exposing selectively said film to said secondary light beam.

21. An apparatus as defined in claim 18 further comprising:
   supplemental mirror pivoting means operatively associated with said mirror for pivoting said mirror about said horizontal and vertical axis independently of said cam means and in angular increments smaller than those which result from said incremental advancement of said cam means;
   means responsive to selected characteristic eye movement of a subject for advancing said cam means in incremental steps in response to detection of eye movement having said selected characteristics; and
   means responsive to failure of said eye movement detecting means to detect said characteristic eye movement for actuating said supplemental mirror pivoting means.

* * * * *